Aug. 4, 1936.          C. BARBIERI          2,049,417
ROTARY CUP MACHINE
Original Filed Sept. 10, 1931    10 Sheets-Sheet 5
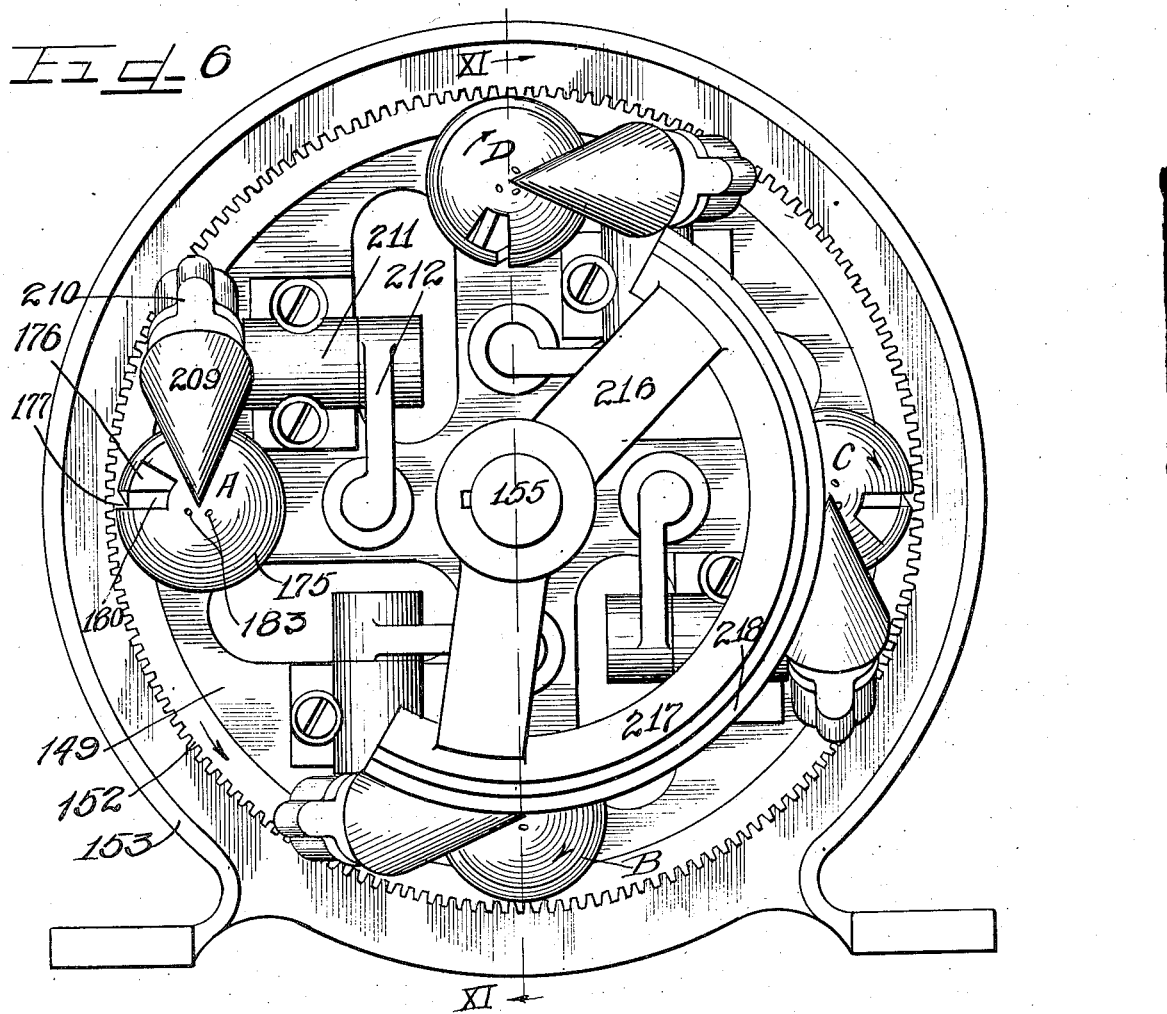
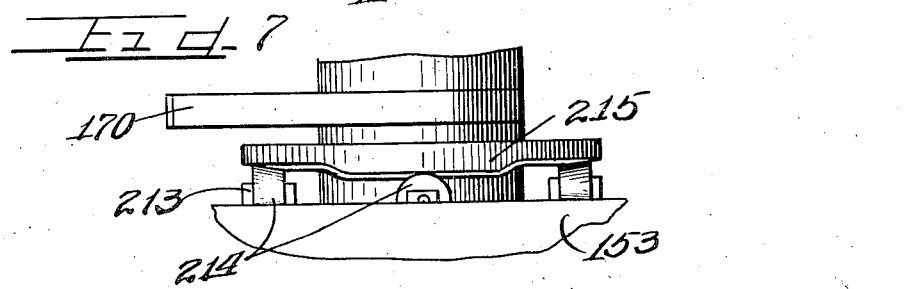
Inventor
Cesare Barbieri Aug. 4, 1936. C. BARBIERI 2,049,417
ROTARY CUP MACHINE
Original Filed Sept. 10, 1931 10 Sheets-Sheet 6
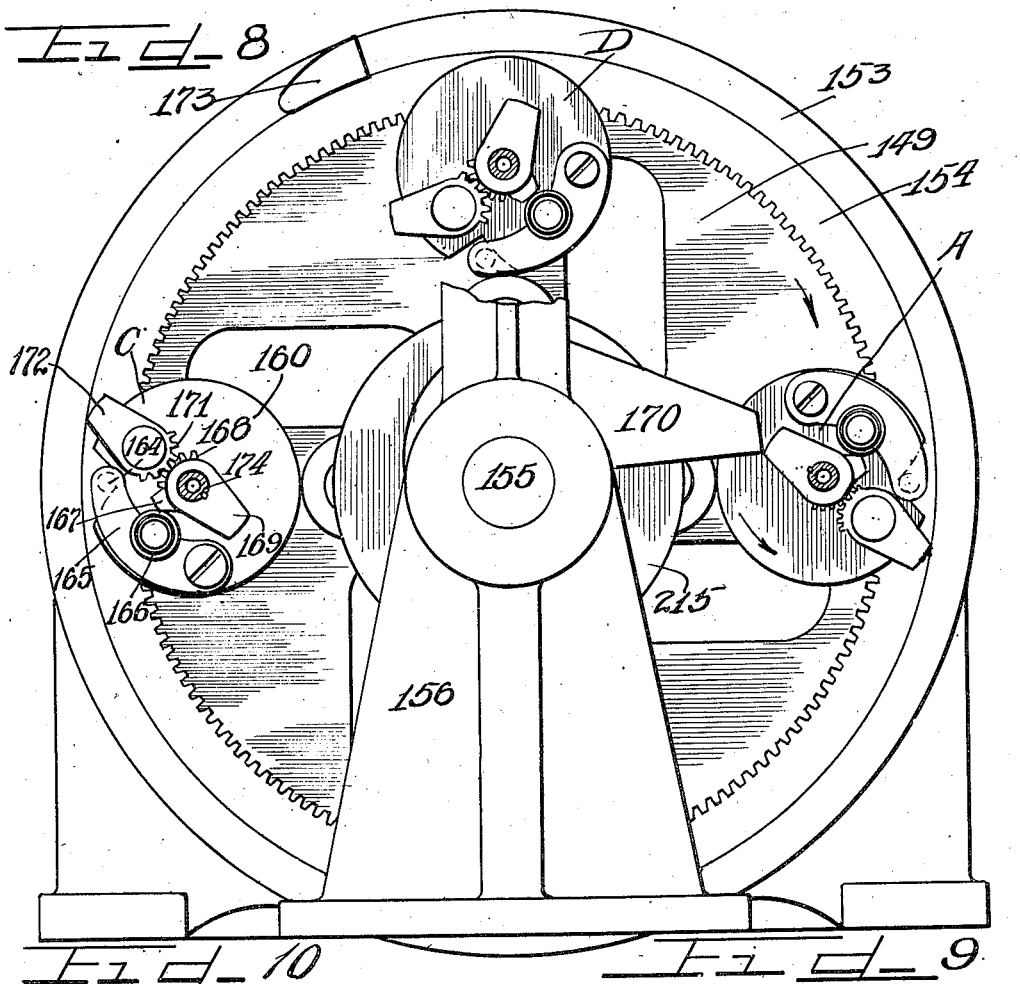
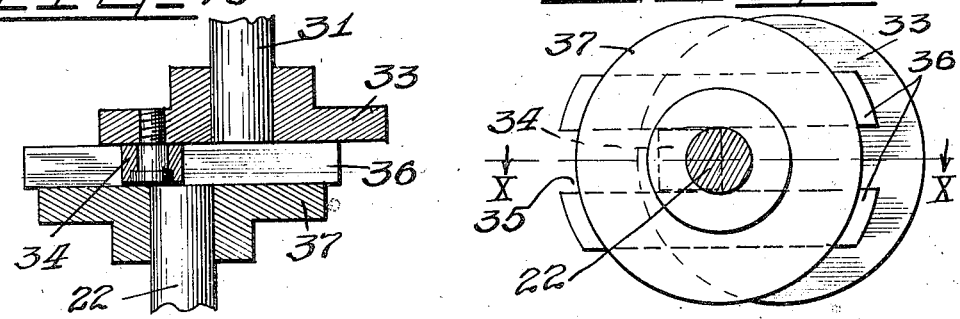
Inventor
Cesare Barbieri
By Charles W. Hills Attys.

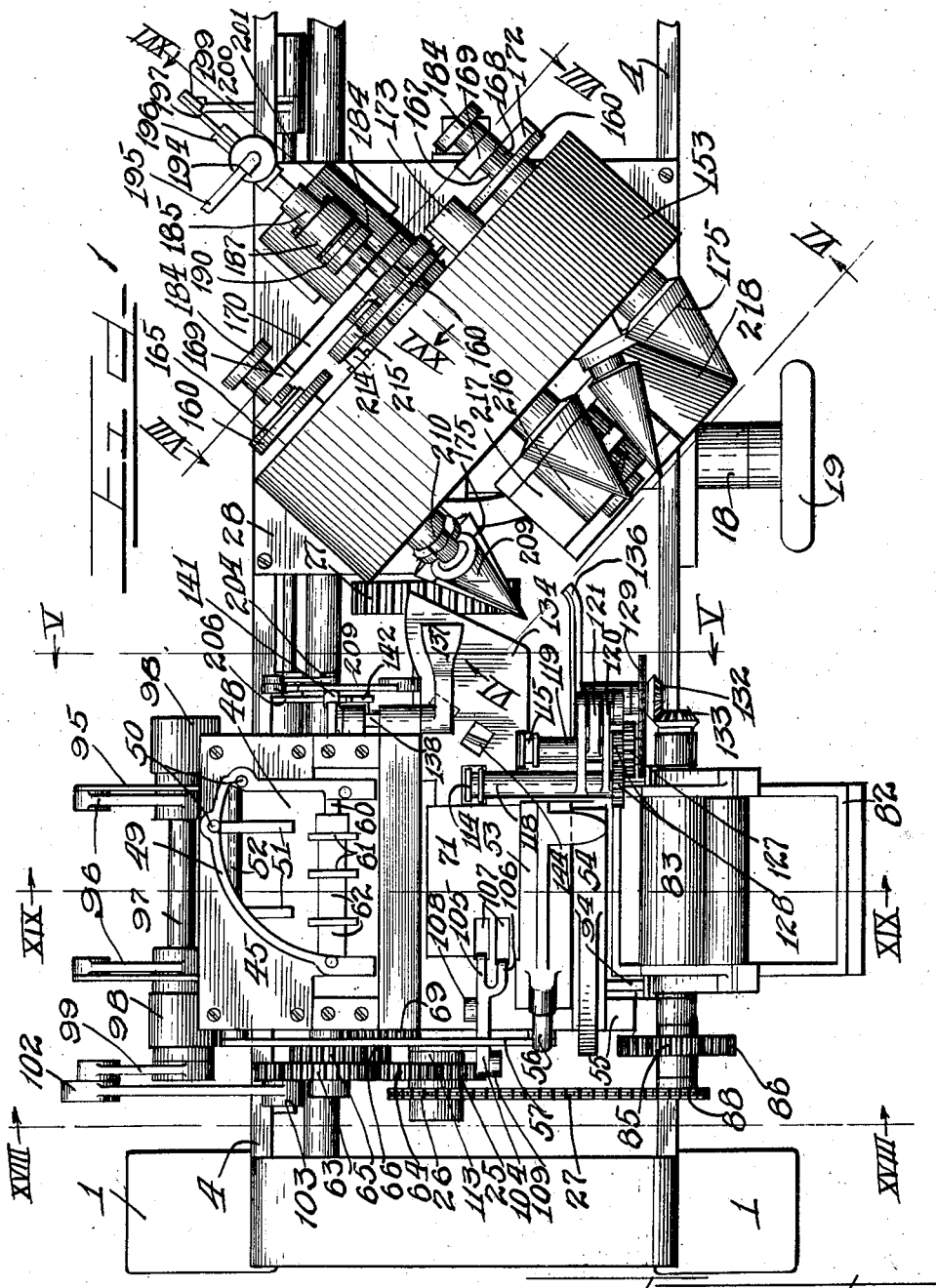

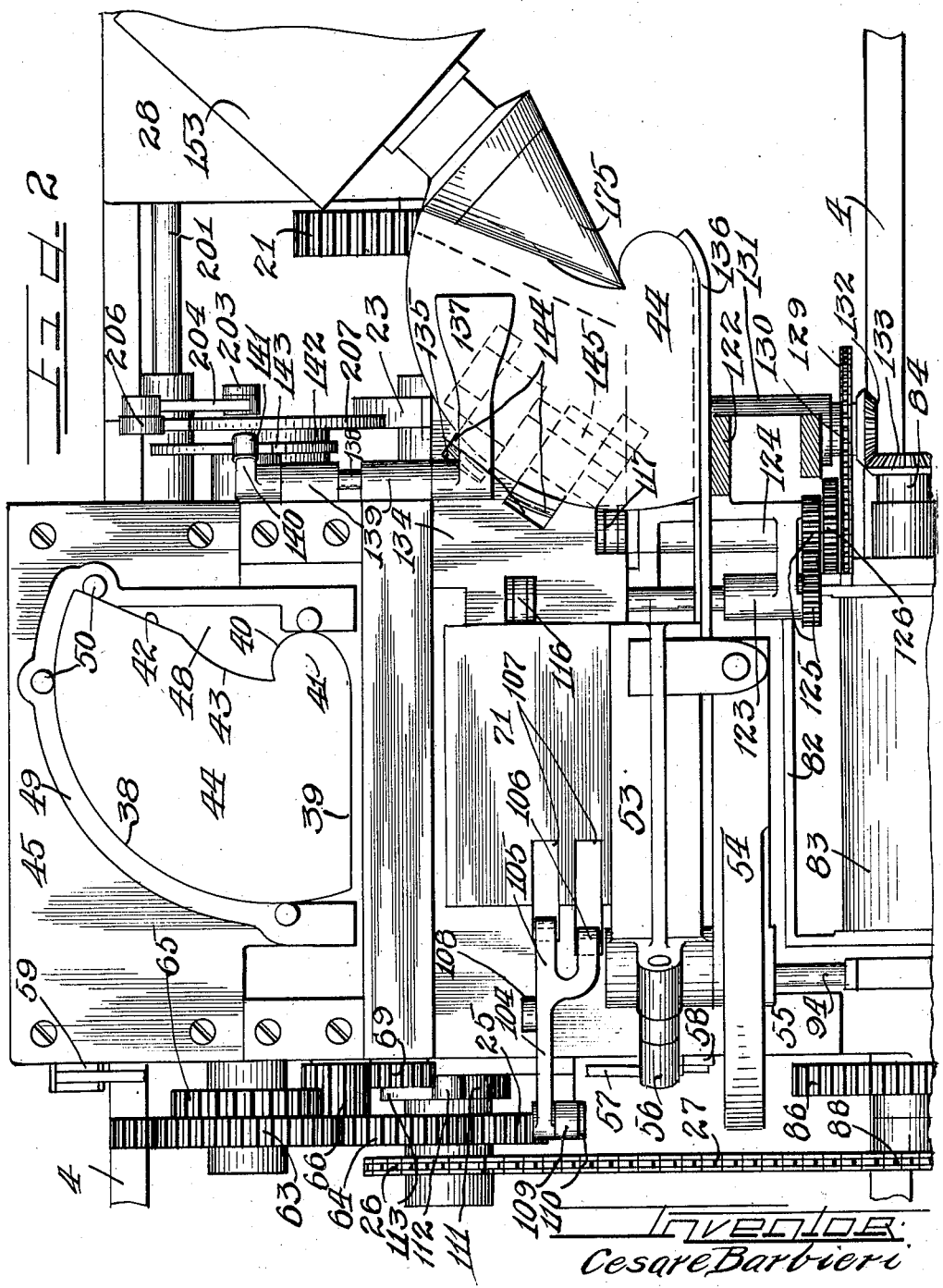

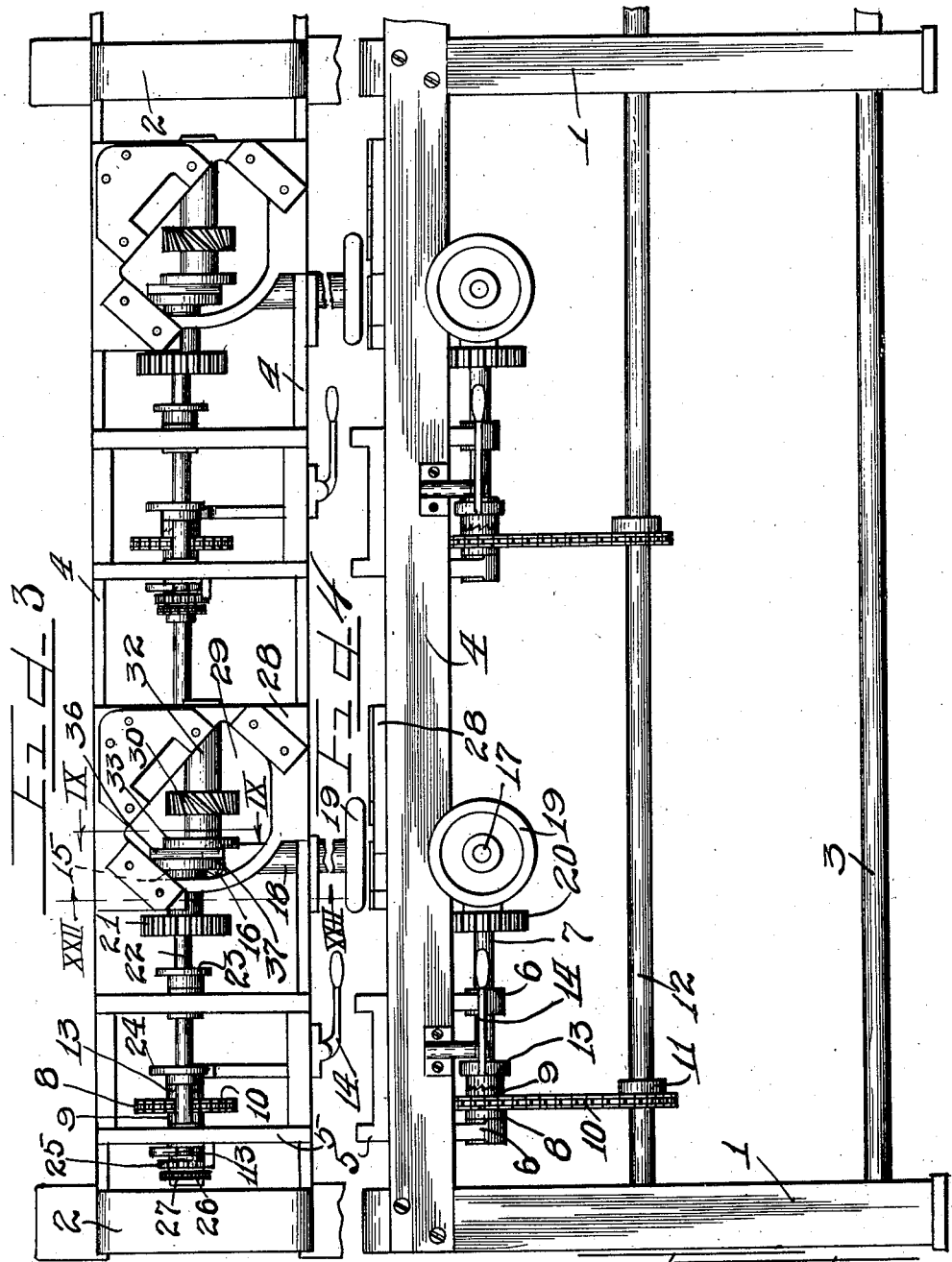

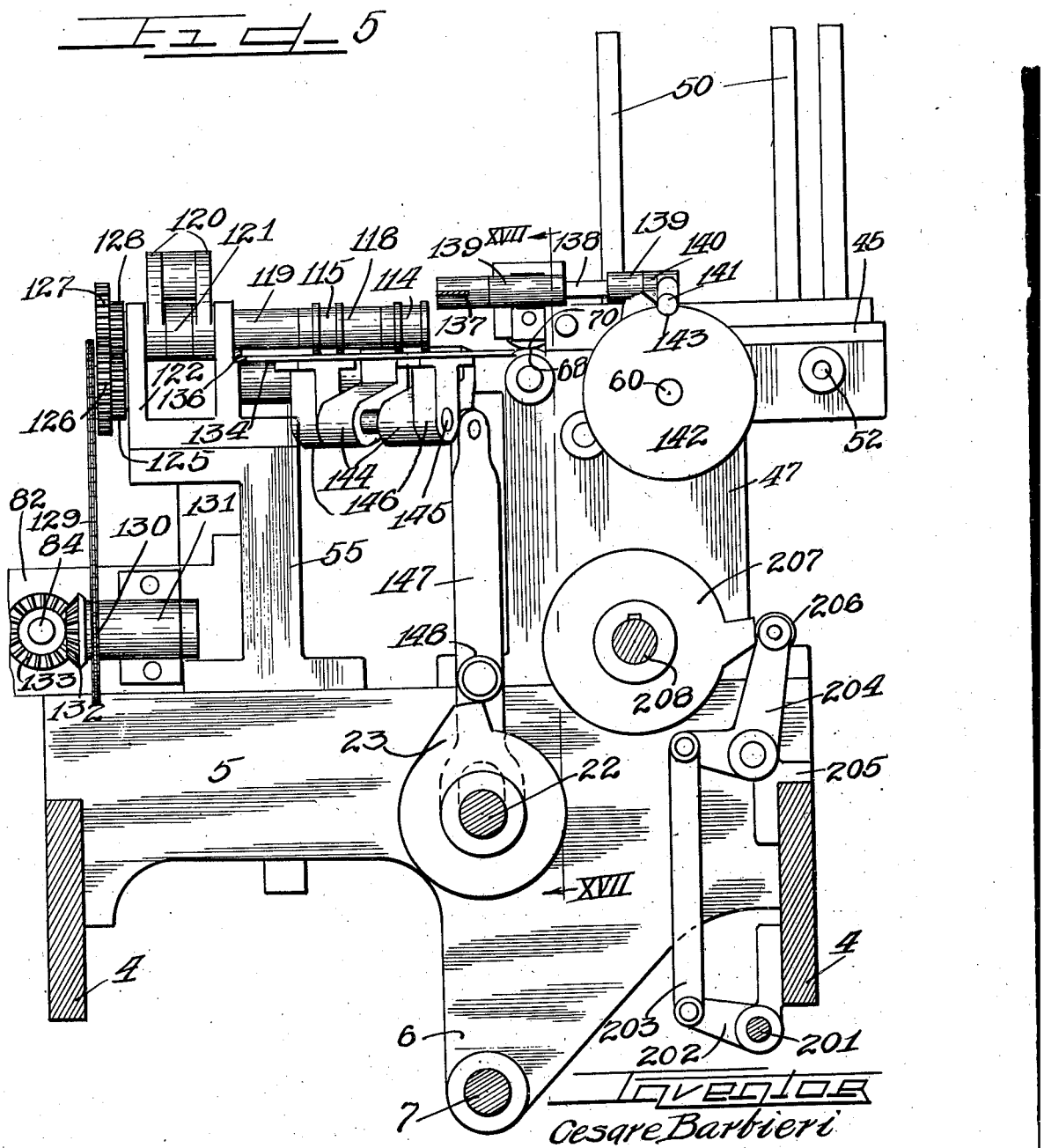

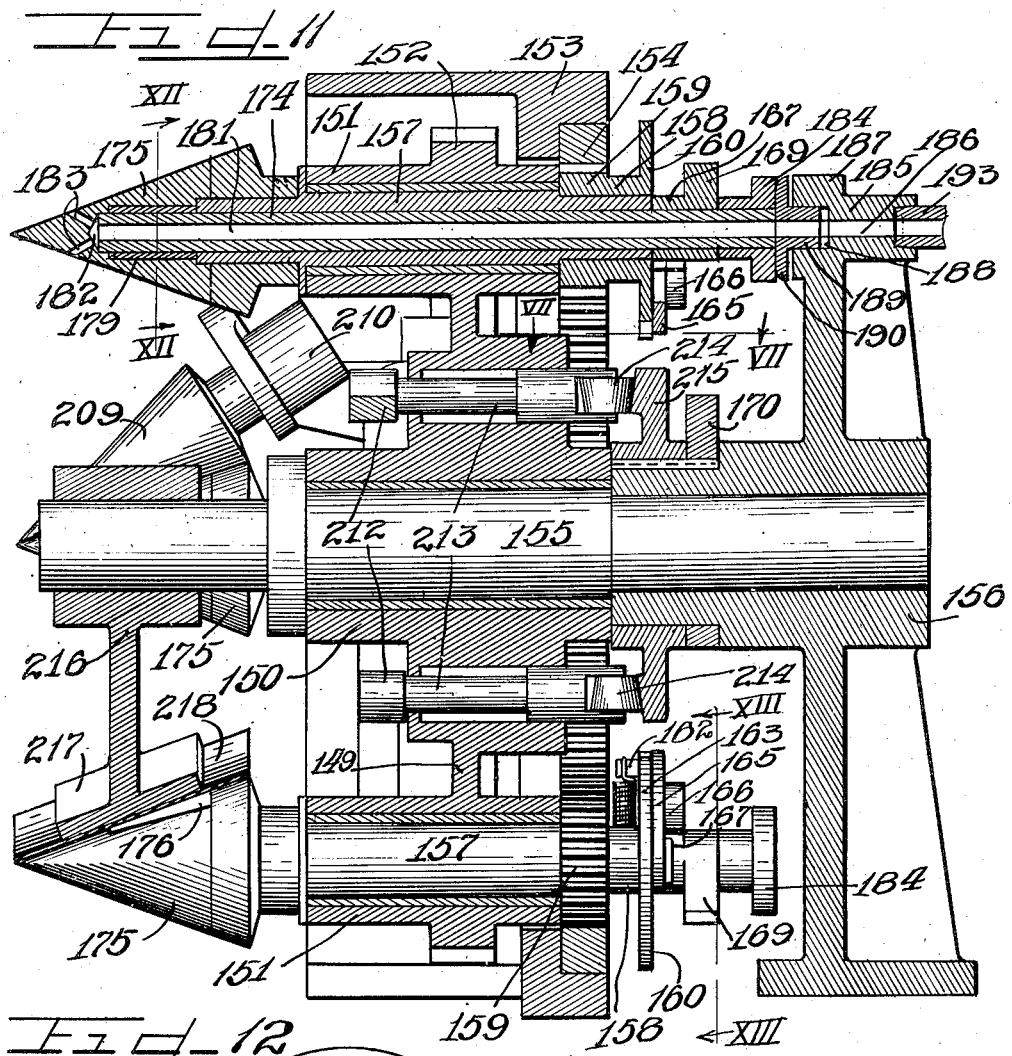

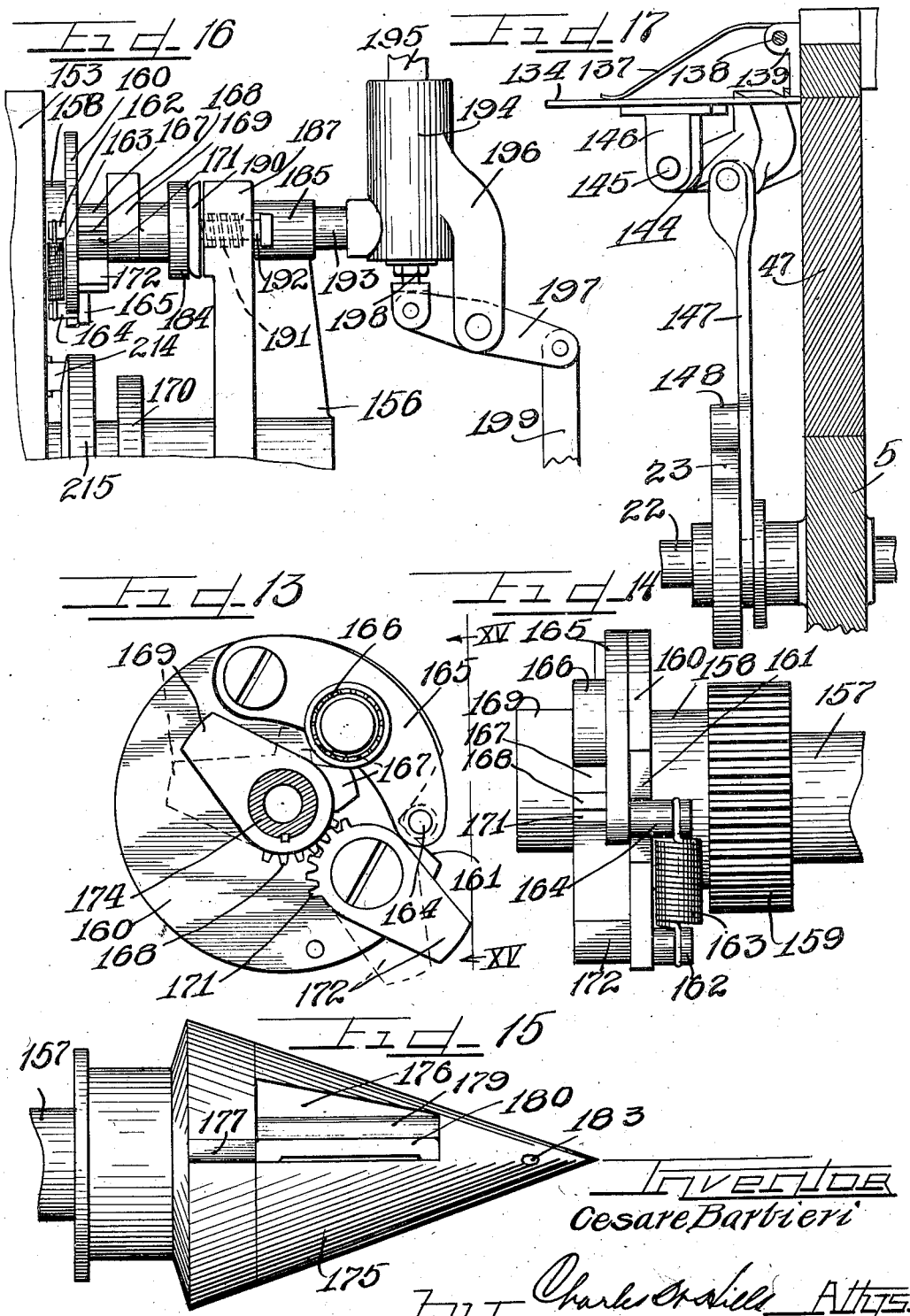

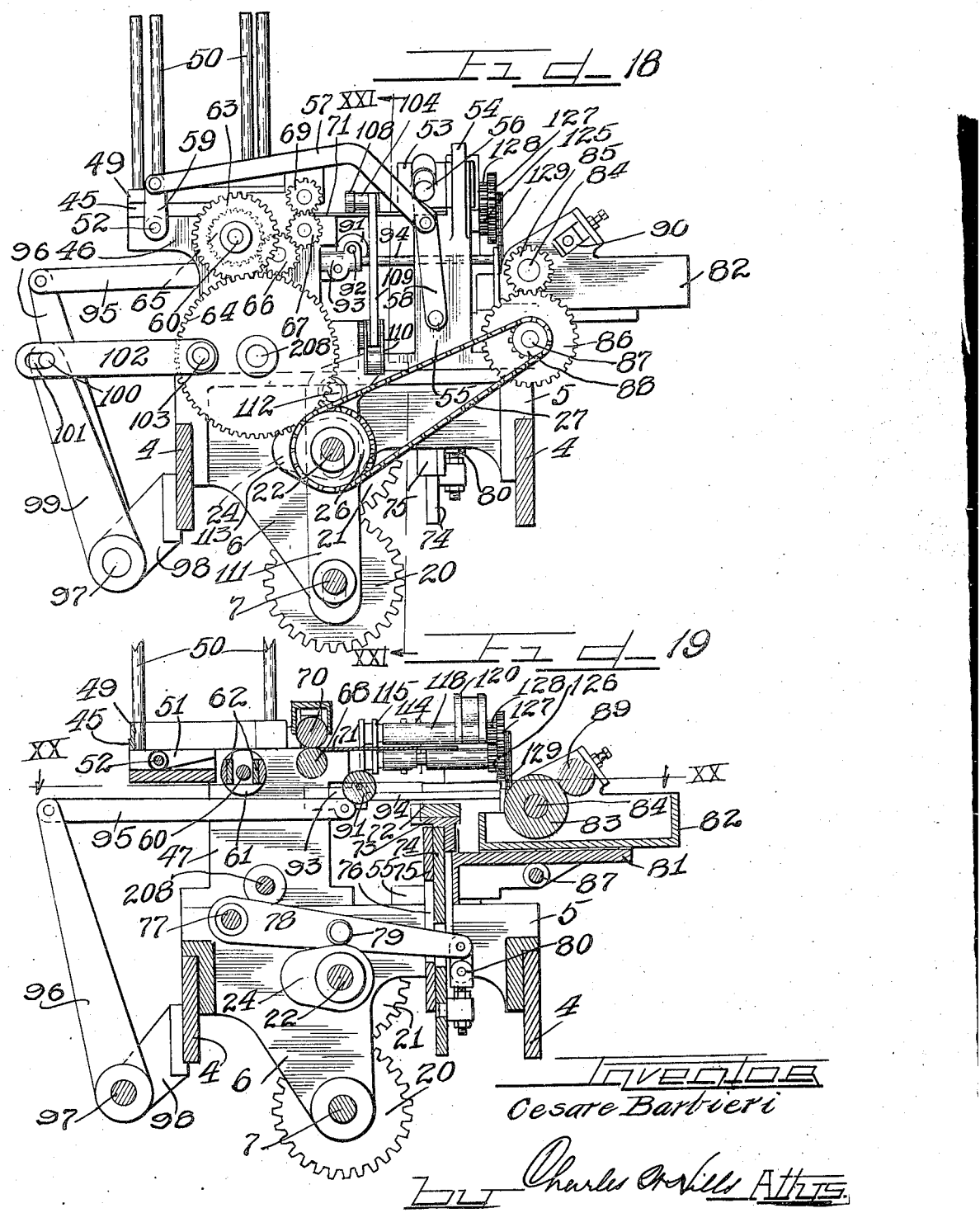

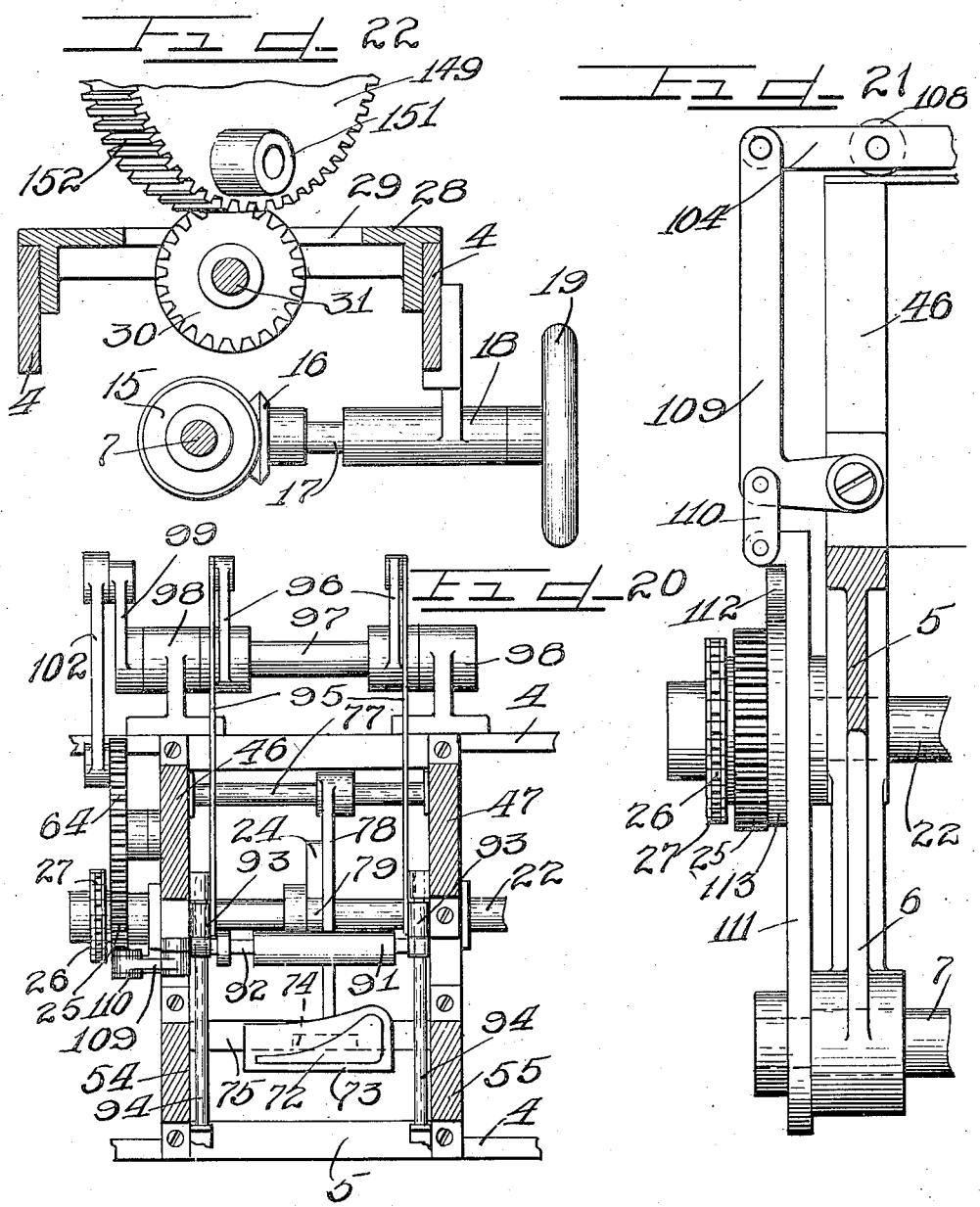

Patented Aug. 4, 1936

2,049,417

UNITED STATES PATENT OFFICE 2,049,417

ROTARY CUP MACHINE

Cesare Barbieri, New York, N. Y., assignor to Vortex Cup Company, Chicago, Ill., a corporation of Delaware Application September 10, 1931, Serial No. 562,003
Renewed August 2, 1934

23 Claims. (Cl. 93—36)

The present invention pertains to a rotary type of a container making machine and relates more particularly to an improved and simplified machine adapted to automatically produce containers from glued blanks which are delivered one at a time from a magazine to a gluing mechanism from which the glued blanks are individually advanced by improved feed and centering means into the field of operation of a container forming wheel including improved container forming mandrels and rotatable and stationary presser means whereby the advanced glued blanks are adapted to be formed into containers which are eventually advanced into a position wherein the completed containers are released and discharged from the machine.

It is an object of this invention to provide an improved type of rotary cup making machine including means for removing blanks from a magazine and delivering said blanks to a gluing mechanism from which the glued blanks are advanced and centered for delivery to rotatable and translatable mandrels or formers having improved gripping means for engaging and holding the blanks in associated relation with the mandrels to permit the blanks to be formed into cups with the aid of movable and stationary pressers which are positioned to act on the formed cups as they are advanced by means of a continuously rotatable variable speed turret wheel which carries the mandrels into position for coaction with discharge means for releasing and then discharging the formed cups from the mandrels.

It is also an object of this invention to provide an improved type of cup making machine including means for applying glue to a blank and then advancing the glued blank and centering the same for delivery to a continuously rotatable variable speed turret wheel which carries a forming mandrel having improved grippers contained therein for gripping the glued blank and forming the same around the mandrel to be acted on by a rotatable and translatable presser as the cup is advanced over a resilient stationary presser to complete the forming of the cup which is advanced by the mandrel into a position wherein the cup is released and is automatically blown off of the forming mandrel.

A further object of the invention is the provision of an improved container making machine wherein a continuously rotatable variable speed turret wheel carries a plurality of rotatable forming mandrels having improved interior grippers permitting each of the mandrels when in an initial position to receive and grip a glued blank and then form the blank around the mandrel and advance the formed blank through the field of operation of rotatable and stationary pressers to produce a liquid tight cup or container which in a predetermined position of the mandrel is automatically released and blown from the mandrel.

It is furthermore an object of this invention to provide an improved type of rotary cup making machine wherein primary feed means are adapted to remove a blank from a magazine and advance the blank to a gluing mechanism from which the glued blank is adapted to be removed by a secondary feed means adapted to move the glued blank at substantially right angles to its original path of movement to centering means to be centered thereby and delivered to a rotatable and translatable mandrel having interior blank grippers operable by improved mechanisms carried on the mandrel and operable by stationary controls positioned in the path of travel of the translatable mandrel to cause gripping and release of the grippers at predetermined times to first cause gripping of a blank as it is advanced to the mandrel and later cause release of the completed cup to permit the cup to be discharged from the mandrel by a discharge mechanism which is so positioned that when the mandrel carrying a completed cup reaches a predetermined position of translation the mandrel will cause automatic operation of the discharge mechanism to cause discharge of the formed cup.

It is also an object of this invention to provide a rotary type of cup or container making machine wherein a continuously rotatable variable speed turret wheel is provided with a plurality of rotatable forming mandrels having blank grippers supported therein to be operated by improved control mechanisms operable by stationary members positioned in the path of movement of the control mechanisms, so that blanks fed to the mandrels are initially gripped and then formed around the mandrels with the aid of rotatable pressers and a resilient stationary presser to complete the forming of cups or containers on the mandrels and the eventual release of said containers or cups by the automatic operation of the gripper control mechanisms, as the container carrying mandrels are advanced into a discharge position to cause automatic operation of a discharge mechanism whereby the containers or cups when released by the grippers are blown or discharged from the forming mandrels.

Another object of the invention is to provide a container making machine including in combination a blank gluing unit and a blank carrying magazine which are so positioned that a primary feed mechanism is adapted to deliver blanks from the magazine to the gluing mechanism after which a secondary feed mechanism is adapted to engage the glued blanks and advance the same at substantially right angles from the original path of movement of the blanks into the field of operation of centering and holding means adapted to position the glued blanks so that the advanced margins thereof are adapted to be projected into openings of rotatable forming mandrels carried by a rotatable turret wheel whereby the advanced glued blanks are adapted to be gripped by gripping mechanisms within the mandrels so that when the mandrels are rotated and advanced the blanks are adapted to be formed around the mandrels with the aid of rotatable pressers and with the additional aid of a stationary resilient presser to cause the blanks to be formed into containers which are eventually adapted to be released by the gripping mechanisms and by the rotatable pressers when the mandrels reach predetermined positions in which discharge mechanisms are adapted to be automatically operated to cause the released containers to be discharged from the mandrels.

It is an important object of this invention to provide an improved and simplified form of rotary container type machine wherein a blank supply magazine is adapted to deliver blanks to a gluing mechanism from which the glued blanks are adapted to be further advanced at substantially right angles to their original path of movement by auxiliary feed means and centering devices which serve to advance gripping edges of the glued blanks into the field of operation of gripper carrying rotatable mandrels and rotatable pressers which are supported on a continuously rotatable variable speed wheel to cause the glued blanks to be formed into containers around the mandrels and furthermore cause the formed containers to be advanced and rolled over a resilient stationary presser to complete the forming of the containers prior to reaching a discharge position in which the completed containers are automatically released by the rotary pressers and by the gripping mechanisms of the mandrels to permit a discharge mechanism to be set into operation when a forming mandrel is advanced into a position of alignment with the discharge mechanism to cause a completed container to be automatically blown or discharged from the machine.

Other and further important objects of this invention will be apparent from the disclosures in the specification and the accompanying drawings.

This invention (in a preferred form) is illustrated in the drawings and hereinafter more fully described.

On the drawings:

Figure 1 is a top plan view of an improved rotary container making machine embodying the principles of this invention.

Figure 2 is an enlarged fragmentary top plan view of the blank carrying magazine and the auxiliary blank feed and centering mechanisms illustrating portions of the gluing mechanism and the container forming means.

Figure 3 illustrates a top plan view of the chassis or framework of a plurality of rotary container forming machines connected in series with the forming machines removed to illustrate the driving and control mechanisms.

Figure 4 is a side elevation of the frame and driving mechanisms illustrated in Figure 3.

Figure 5 is an enlarged transverse vertical detail view of the machine taken on line V—V of Figure 1 with parts omitted.

Figure 6 is an enlarged vertical view of the container forming unit taken on line VI—VI of Figure 1.

Figure 7 is a fragmentary detail view taken on line VII—VII of Figure 11 and illustrating the control mechanism for governing the operation of the rotatable pressers which coact with the forming mandrels.

Figure 8 is an enlarged vertical detail view of the rear of the container forming unit taken on line VIII—VIII of Figure 1 with parts broken away and parts omitted.

Figure 9 is an enlarged sectional view taken on line IX—IX of Figure 3 and illustrating the driving control for producing the variable speed of the continuously rotatable turret wheel of the machine.

Figure 10 is a detail sectional view with parts in elevation taken on line X—X of Figure 9.

Figure 11 is a fragmentary vertical sectional view of the container forming unit taken on line XI—XI of Figure 6 with parts broken away and with parts shown in elevation.

Figure 12 is an enlarged transverse detail section of one of the forming mandrels taken on line XII—XII of Figure 11.

Figure 13 is an enlarged sectional view taken on line XIII—XIII of Figure 11 illustrating the gripper control mechanisms in one position of adjustment thereof and indicating the operation in dotted lines.

Figure 14 is a side elevation of the gripper control mechanisms illustrated in Figure 13.

Figure 15 illustrates a side elevation of one of the container forming mandrels.

Figure 16 is a fragmentary detail view taken on line XVI—XVI of Figure 1 illustrating the pneumatic discharge mechanism showing one of the gripper control mechanisms aligned therewith.

Figure 17 is an enlarged fragmentary vertical sectional view taken on line XVII—XVII of Figure 5 illustrating the blank centering mechanisms and the control means thereof.

Figure 18 is a vertical elevational view taken on line XVIII—XVIII of Figure 1 illustrating the blank moving magazine and the operating means associated therewith and also illustrating portions of the glue applying mechanism.

Figure 19 is a vertical sectional view taken on line XIX—XIX of Figure 1 and illustrating sectional views of the gluing mechanisms and the magazine and blank feed mechanism.

Figure 20 is a horizontal sectional view taken on line XX—XX of Figure 19 with parts omitted and illustrating the glue applying pad and the roller mechanism for applying glue thereto.

Figure 21 is an enlarged fragmentary detail vertical sectional view take on line XXI—XXI of Figure 18 illustrating the control mechanisms for governing the operation of the secondary or auxiliary blank feed mechanisms.

Figure 22 is an enlarged fragmentary detail vertical sectional view taken on line XXII—XXII of Figure 3 illustrating the turret wheel driving connection and a manual control for operating the machine.

As shown on the drawings:

The improved container or cup making machine of the present invention is of the rotary type and may be mounted on a framework together with similar machines all of which are connected for operation from a common driving shaft. In the present description a single machine will be described. The rotary container making machine embraces a supporting framework including supports or uprights 1 connected by cross members 2. The uprights or legs 1 are connected by longitudinally disposed lower brace members 3 and upper beams or sills 4. Secured transversely upon the top of the supporting frame sills 4 is a cross frame 5 having integrally formed thereon two downwardly projecting bearing arms 6 having journalled therein an auxiliary unit drive shaft 7. Rotatably mounted on the auxiliary driving shaft 7 is a sprocket 8 having a clutch hub 9 forming a part thereof. Trained around the sprocket 8 is a main driving chain 10 which projects downwardly and is trained around a main driving sprocket 11 which is securely mounted upon a main or primary driving shaft 12 which as clearly illustrated in Figure 4 is journalled in suitable bearings provided in the main frame of the machine. The main driving shaft 12 is adapted to be driven by means of a motor or any other suitable driving power and is so positioned that it is adapted to transmit power to a plurality or series of container making machines mounted in alignment or in any other convenient arrangement upon the main supporting framework. Slidably keyed upon the auxiliary or secondary driving shaft 7 is a clutch collar 13 which is controlled by a control handle 14 which is pivotally mounted on the machine framework. Rigidly secured to one end of the auxiliary driving shaft 7 is a bevel gear 15 which meshes with a bevel gear 16. The bevel gear 16 is secured on a stub shaft 17 which is journalled in a bearing bracket 18 secured to one of the sills 4 of the machine framework as clearly illustrated in Figure 22. Engaged on the outer end of the stub shaft 17 is a manually operable knob or handle 19 whereby, when the clutch mechanism is thrown out, the container making machine may be manually operated when necessary. Secured on the auxiliary shaft 7 adjacent the bevel gear 15 is a driving gear 20 which is in mesh with a gear 21. The gear 21 is rigidly secured upon an auxiliary shaft 22 which is journalled in suitable bearings provided on the arms 6 of the auxiliary framework 5. Secured on the auxiliary shaft 22 between the gear 21 and the auxiliary frame 5 is a blank centering control cam 23. Also secured on the auxiliary shaft 22 between the arms 6 of the frame 5 is an adhesive applying plate or pad control cam 24. Secured on one end of the auxiliary shaft 22 is a blank feed mechanism control gear 25. Also secured on the auxiliary driving shaft 22 to the outside of the feed mechanism control cam gear 25 is an adhesive mechanism driving sprocket 26 around which a driving chain 27 is trained.

The container or cup forming unit of the machine is supported on a table or mounting plate 28 which is secured upon the framework sills 4 as clearly illustrated in Figure 3. The supporting table 28 is provided with an opening 29 through which a spiral driving gear 30 projects. The spiral driving gear 30 is supported on an auxiliary shaft 31 as clearly illustrated in Figure 22. The auxiliary shaft 31 is journalled in bearings 32 which are formed or mounted on the bottom of the table 28. The auxiliary shaft 31 is slightly offset with respect to the auxiliary driving shaft 22 from which it is adapted to receive a continuous variable speed drive by means of a variable speed unit comprising a disc 33 having a slide block 34 eccentrically mounted thereon. The disc 33 is rigidly secured on one end of the shaft 31 as illustrated in Figure 10 to position the block 34 so that it operates in a guide groove 35 formed between a pair of parallel guide bars 36 which are rigidly secured on opposite sides of the center of a second disc 37 which is rigidly secured on one end of the auxiliary driving shaft 22.

The main driving connections for the various units forming part of the improved container making machine having been described the construction of the various units will now be taken up. In the present form of the machine the same is adapted to produce conical paper cups but it will of course be understood that the machine may be adapted for making cups or containers of different shapes and sizes. The cup blank used in this type of conical cup making machine is preferably constructed or prepared paper or the like and each blank is of substantially quadrantal form as illustrated in Figure 2 and is bounded by an arcuate edge 38 which eventually forms the drinking rim or edge of a completed cup. The cup blank furthermore is bounded by a substantially straight edge 39 one end of which connects up with the arcuate edge 38 while the other end merges into a curved edge 40 which forms an extension or tab 41. The remaining edge of the blank is of composite form and consists of an outer radial straight edge 42 and an inwardly curved edge 43 which extends from the inner end of the edge 42 to one end of the curved edge 40 forming the tab 41. The outer end of the straight edge 42 connects up with the arcuate edge 38 of the blank. By providing the blank with the composite edge 42—43 the margins of the blank bounded by the straight edge 42 forms a gripping tab or lip which when a blank is advanced to the forming machine will enter the recess of a forming mandrel to be engaged by gripping means to facilitate forming of the blank into a cup as hereinafter more fully described. One surface of the blank extension 41 and one side of the margin of the blank adjacent the straight edge 39 is adapted to be provided with a layer or patch of cementitious material, the edge of said patch of adhesive stopping short of the edges 39 and 40 of the cup blank. The shape of the adhesive layer or patch applied to the cup blank is determined by the shape of a glue stamping pad hereinafter further described.

The cup blank feed mechanism will now be described. A stack of paper cup blanks 44 shaped as illustrated in Figure 2 is adapted to be supported in a blank holding magazine comprising a base plate 45 which is secured upon supporting legs 46 and 47 which are secured upon the top of opposite sides of the auxiliary frame 5. The magazine base plate 45 is provided with an opening 48 and an open rim 49 having blank guide posts 50 secured thereto for the proper guidance of a stack of blanks. The stack of blanks is supported upon a pair of blank supporting arms 51 which are secured to a rocker shaft 52 which is journalled in suitable bearings afforded by the supporting legs 46 and 47. The arms 51 thus afford a pivotal support for the stack of blanks to permit the stack of blanks to be raised out of feeding position when the supporting arms are swung upwardly.

The movement of the blank supporting arms 51, for the purpose of raising the stack of blanks, is controlled by the manual movement of a blank heater 53 which is pivotally mounted at one end on a supporting bracket or wall 54 secured or formed on an auxiliary supporting frame 55 which is rigidly secured upon the auxiliary frame 5 as clearly illustrated in Figures 5 and 18. The heater 53 may be heated by any suitable means such as electric heating coils or the like and is provided for the purpose of heating blanks to permit a coating or patch of adhesive or glue to readily adhere thereto. Supported on the pivoted end of the heater 53 is a roller 56 which has rolling contact with a cam bar 57. One end of the cam bar 57 is pivotally connected to the upper end of a link or toggle member 58 the lower end of which is pivotally supported on the auxiliary frame 55. The opposite end of the cam bar 57 is pivotally connected to the upper end of a crank arm 59 the lower end of which is secured on one projecting end of the rocker shaft 52 on which the blank supporting arms 51 are supported.

The stack of blanks in the magazine in addition to being supported on the supporting arms 51 are supported on a blank feed device comprising a cup blank feed shaft 60. The blank feed shaft 60 is journalled in bearings formed on the magazine arms 46 and 47. Supported on the feed shaft 60 are a plurality of spaced discs 61 between each pair of which a pair of diametrically opposite blank feed friction blocks or pads 62 are mounted with the pads having portions thereof projecting to engage the lowermost cup blank in the magazine at each half revolution of the shaft 60.

Fixed on one projecting end of the blank feed shaft 60 is a gear 63 which meshes with a large intermediate gear 64 which is rotatably supported on the outer side of the magazine supporting legs 46 as clearly illustrated in Figure 18. The intermediate gear 64 is in mesh with the blank feed driving gear 25 to receive a drive therefrom.

Also secured on the blank feed shaft 60 to the inside of the gear 63 is a gear 65 which meshes with an intermediate gear 66 fixed on a stub shaft which is journalled in the magazine supporting arm 46 as clearly illustrated in Figure 18. The intermediate gear 66 drives a gear 67 keyed on one end of a lower blank feed roller 68 which is supported in suitable arms forming a part of the magazine framework. Meshing with the lower blank feed roller gear 67 is an upper blank feed roller gear 69 which is secured on one end of an upper blank feed roller 70 supported in the magazine framework above the roller 68.

The lowermost blank from the magazine is adapted to be removed from the bottom of the stack by means of the feed pads 62 and the removed blank is fed between the feed rollers 68 and 70 which serve to advance the blank upon a blank receiving table 71 with the portion of the blank adjacent the edges 39 and 40, projecting beyond the blank supporting table 71 and beneath the blank heater 53 into a position to permit a film or patch of adhesive or glue to be applied thereto by means of a glue pad 72 (Figure 20). The pad 72 is formed on the top of a glue stamping plate 73 which is mounted on the upper end of a vertically slidable bar 74. The glue pad supporting bar 74 is slidably mounted to operate vertically in a guide plate 75 which is rigidly supported transversely in the auxiliary mounting frame 5 and is provided with an opening 76 as clearly illustrated in Figure 19. Supported in the auxiliary frame 5 is a shaft 77 on which is pivotally mounted a lever or arm 78 having a roller 79 rotatably supported on one side thereof and in rolling contact with the glue pad control cam 24 to cause vertical reciprocation of the glue pad by means of the pivoted lever 78. The lever 78 projects through the guide plate opening 76 and through an opening in the glue pad supporting bar 74 and has an adjusting mechanism 80 connected thereto and to the slide bar 74 as clearly illustrated in Figure 19.

A glue applying mechanism forms a unit of the cup making machine and is provided for the purpose of applying glue to the glue pad 72. Referring to the detailed Figures 18, 19, and 20 a shelf 81 is rigidly secured upon the auxiliary frame 5 and has supported thereon a glue tank or trough 82. Rotatably mounted within the tank 82 is an adhesive applying roller 83 which rotates in the glue within the tank. The roller 83 is supported on a shaft 84 one end of which projects from the tank 82 and has a gear 85 mounted thereon. The gear 85 meshes with a gear 86 which is rotatably supported on a stub shaft 87 supported on the shelf 81. Also mounted on the stub shaft 87 to the outside of the gear 86 is a small sprocket 88 around which the driving chain 27 is trained as clearly illustrated in Figure 18. An adhesive wiping roller 89 is rotatably supported in adjustable bearing units 90 supported in the side walls of the glue tank 82. The wiping roller 89 coacts with the glue feed roller 83 to wipe the excessive glue therefrom.

An adhesive transfer or applying roller 91 is mounted to be moved into rolling contact with the adhesive feed roller 83 to be supplied with a coating of adhesive. The roller 91 is supported on a shaft 92 the ends of which are journalled in a pair of blocks 93 slidably mounted upon a pair of guide rods 94 which are supported by arms secured to the glue tank 82 and by supports fastened on the inner sides of the legs or plates 46 and 47 forming a part of the machine framework, as illustrated in Figures 19 and 20. Pivoted on each slide block 93 is a connecting bar or link 95 the outer end of which is pivoted to the upper end of a crank arm 96. The two crank arms 96 are fixed on a rocker shaft 97 which is journalled in bearing brackets 98 secured to one of the framework sills 4 as clearly illustrated in Figure 20. Also fixed on the end of the rocker shaft 97 is a lever or crank arm 99. Projecting from one side of the upper end of the lever arm 99 is a pin 100 which projects through a slot 101 (Figure 18) provided in one end of an eccentric bar 102. The inner end of the eccentric arm 102 is eccentrically connected on an eccentric pin 103 projecting from the outer side of the control gear 64 which also governs the transmission of a drive to the feed mechanisms forming a part of the blank holding magazine unit.

The above described mechanism serves to reciprocate the adhesive applying roller 91 at predetermined intervals to cause the roller 91 to roll over the adhesive stamping pad 72 which is mounted upon the stamping plate 73 and is adapted to be reciprocated at predetermined intervals governed by the operation of the control cam 24. The glue applying roller 91 and the glue stamping pad mechanism has the operations thereof so timed that when the roller 91 is in a retracted position the glue pad 72 is adapted to be advanced upwardly to stamp or apply a patch or coating of glue to the under surface of the projecting portion of a cup blank which has been advanced onto the table 71 with the projecting portion of the blank positioned beneath the heater 53 which acts as a stop member as well as a heating member for a blank which is being stamped with glue.

After a blank has been moved onto the table 71 and has been stamped with a spot of glue the glued blank is next removed or moved transversely across the supporting table 71 in a direction substantially at right angles to the path of movement of the blank between the blank feed magazine and the glue applying mechanism. The glued blank is moved transversely by a secondary or auxiliary blank feed mechanism comprising in part a blank pusher arm 104 having integrally formed on the inner end thereof a yoke or fork consisting of two pusher fingers 105 and 106 with the arm or finger 105 being slightly longer than the finger 106 to afford an arrangement whereby the fingers to conform to the curvature of the arcuate edge 38 of a blank 44. The pusher fingers 105 and 106 have the ends thereof curved or bent downwardly to project through parallel slots 107 (Figure 2) which are provided in the table 71 and a table plate mounted adjacent thereto forming a part of the machine framework. Rotatably mounted on one side of the pusher arm 104 is a guide roller 108 which is positioned to roll over the top of the table as clearly illustrated in Figures 2 and 21. Pivotally connected to the outer end of the blank pusher arm 104 is the upper end of a bellcrank 109. The shorter arm of the bellcrank 109 is pivotally supported on the machine framework leg or bracket 46. Pivotally connected at substantially the point of bend of the bellcrank 109 is a connecting link 110 the lower end of which is pivotally connected to the upper end of an actuating bar or arm 111. The actuating bar 111 is provided with slots (Figure 18) through which the shafts 22 and 7 project. Rotatably supported on the outer side of the actuating arm 111 is a roller 112 which has rolling contact with the periphery of a pusher arm control cam 113 which is mounted on the shaft 22 adjacent the inner side of the gear 25 as clearly illustrated in Figure 21. When the pusher arm 104 is actuated by the control cam 113 through the connecting mechanism, the pusher fingers 105 and 106 are advanced inwardly to engage the arcuate edge of a glued blank 44 positioned on the table 71 and cause the glued blank to be pushed transversely across the table 71 beneath upper fed rollers 114 and 115 and above lower feed rollers 116 and 117. The upper feed rollers 114 and 115 are supported on shafts which are journalled in bearing sleeves 118 and 119 respectively. The bearing sleeve 118 is supported by a pair of parallel arms 120 while the bearing sleeve 119 is supported by an arm 121. The arms 120 and 121 are pivotally mounted on a stub shaft which is in turn supported in a bearing bracket 122 which is secured upon the top of the auxiliary bracket or leg 55 as clearly illustrated in Figure 5. The lower auxiliary feed rollers 116 and 117 are supported on shafts which are journalled in suitable bearings 123 and 124 respectively which form a part of the bracket 122 as clearly illustrated in Figure 2. Secured on the outer ends of the shafts on which the rollers 116 and 117 are mounted are gears 125 which mesh with a small intermediate gear disposed therebetween. Mounted on the shaft on which the lower roller 117 is mounted is a larger gear 126 (Figure 2) which meshes with an upper large gear 127 to permit a drive to be imparted to the upper roller shaft on which the upper roller 115 is mounted. Also mounted on the upper shaft on which the roller 115 is mounted is a small gear 128 which meshes with an intermediate gear which also is in mesh with another small gear 128 mounted on the upper roller shaft on which the roll 114 is mounted. The auxiliary feed roller mechanisms are adapted to receive a drive from a chain 129 which is trained around a sprocket secured on the outer end of the lower roller shaft on which the gear 126 is mounted. The driving chain 129 is also trained around a sprocket 130 which is supported in a stub shaft journalled in a bearing 131 secured to the side of the glue tank 82. Also secured on the outer end of the stub shaft on which the sprocket 130 is mounted is a beveled gear 132 which meshes with a beveled gear 133 secured on one end of the glue roller shaft 84. It will thus be noted that the auxiliary blank feed rollers 114 to 117 inclusive are adapted to receive a drive from the glue roller shaft 84.

A glued blank after being pushed transversely across the table 71 by the pusher fingers 105 and 106 is pushed into engagement with the upper and lower auxiliary feed rollers which in turn engage the blank and still further advance the same over a table extension 134 having openings 135 therein.

When a blank 44 is moved into a glue applying position the straight edge 39 of the blank is moved into contact with a guide strip or bar 136 so that when the glued blank is pushed transversely over the table 71 by means of the pusher fingers 105 and 106 the glued blank is guided between the upper and lower auxiliary feed rollers 114—117 over the table extension 134 and beneath a resilient spring arm 137 which serves to hold the blank flatly upon the table extension 134 as it is advanced toward the cup forming units. The guide bar 136 and the blank guide and pressure arm 137 serve to guide and center the advancing blank. The pressure arm 137 is secured to an auxiliary shaft 138 which is journalled in suitable bearings 139 provided on one side of the magazine framework. Secured on one end of the auxiliary shaft 138 is a crank arm 140 which carries a roller 141. The roller 141 is in rolling contact with the peripheral surface of a control disc 142 which normally acts to hold the pressure arm 137 slightly elevated to permit a blank to be pushed over the table extension 134 into a centered position ready to be advanced or fed to one of the cup forming elements forming part of a cup forming unit hereinafter more fully described. The control disc 142 is provided with a peripheral notch 143 into which the roller 141 is adapted to seat as clearly illustrated in Figure 5 once with each revolution of the control disc 142 to permit the pressure arm 137 to be lowered into contact with the upper surface of a glued blank which is advanced into a centered position over the table extension 104. The control disc 142 is supported on one end of the feed roller shaft 60 to be driven thereby.

After a glued blank has been advanced transversely across the blank supporting table 71 the auxiliary feed rollers 114—117 advance the glued blank over the table extension 134 and over the openings 135 therein into a centered position ready to be advanced or fed to the cup forming unit at a predetermined time. A glued blank is advanced over the table extension 134 by the auxiliary feed rollers until the arcuate edge 38 of a blank is positioned over the table openings 135 to permit a pair of blank feed dogs or fingers 144 to be projected upwardly through the openings 135 at a predetermined time to engage behind the blank arcuate edge 38 to permit the glued blank to be fed into a gripping position as illustrated in Figure 2 with the gripping margin 42 of the blank projected into an opening of a cup forming mandrel forming a part of the cup forming unit. The feed dogs 144 are supported beneath the table extension 134 on a shaft 145 supported in brackets 146 secured to the bottom of the table extension 134. Pivotally secured to one of the blank feed dogs 144 is the upper end of an actuating bar or arm 147 the lower portion of which is provided with a slot through which the shaft 22 projects as clearly illustrated in Figure 5. Rotatably mounted on one side of the connecting bar 147 is a roller 148 which is so positioned that it has rolling contact with the peripheral surface of the control cam 23 which governs the operation of the blank feed fingers 144.

The various operations of forming conical containers or cups from adhesived blanks are focused about a spider or turret wheel 149 including a hub 150 (Figure 11) a plurality of bearing sleeves 151 and a peripheral gear 152 which meshes with the spiral driving gear 30 as clearly illustrated in Figure 22 to permit rotation of the turret wheel. The turret wheel 149 is rotatably mounted within a stationary housing 153 having legs or feet which are rigidly secured to the table or plate 28 over the table opening 29 to permit a drive from the spiral gear 30 to be transmitted to the turret wheel gear 152. The turret wheel housing 153 is open at the front and at the back and has a large internal gear 154 mounted in the rear end thereof.

The turret wheel 149 is rotatably mounted upon a stationary shaft 155 which projects through a supporting bearing 156 the base of which is also rigidly secured upon the table or plate 28. As clearly illustrated in Figure 1 the cup forming unit is mounted upon the table 28 at an angle of substantially 45° in order to facilitate feeding of glued blanks from the table extension 134 to the cup forming mandrels forming a part of the cup forming unit.

Rotatably supported in the four bearing sleeves 151 of the turret wheel are four container or cup forming mandrel mechanisms of similar construction and each comprising a flanged spindle 157 projecting through one of the turret wheel sleeves 151 and secured in position by means of a collar 158 having a gear 159 integrally formed on the inner end thereof and in mesh with the internal gear 154 of the stationary housing 153. Integrally formed on the outer end of the collar 158 is a cam disc 160 having a cam notch 161 formed therein as clearly illustrated in Figure 13. Projecting from the inner side of the cam disc 160 is a pin or post 162 to which one end of a coiled control spring 163 is secured. The other end of the control spring 163 is engaged on a pin or post 164 which projects through the cam notch 161 and is supported on the free end of a control pawl 165 which is pivotally mounted on one side of the cam disc 160 as clearly illustrated in Figures 13 and 14. Rotatably supported on the outer side of the control pawl 165 is a roller 166 which coacts with a short bellcrank arm 167 having a gear segment 168 integrally formed thereon. Integrally formed adjacent one side of the short bellcrank arm 167 is a long bellcrank arm 169 which is so positioned that during the operation of the cup making unit said long bellcrank arm 169 will be moved into a position to coact with a stationary control cam 170 (Figure 8) which governs the closing of the gripper mechanisms when a forming mandrel is in a blank receiving position A of the cup forming unit.

To facilitate explaining of the operation of the cup forming unit the various mandrels forming a part thereof are adapted to be carried through successive positions from the position or station A to intermediate stations B and C and finally to a cup discharge station D. The various stations just mentioned are clearly illustrated in Figures 6 and 8 of the drawings. The control gear segment 168 is in coacting or meshing engagement with a gear segment 171 forming an integral part of a control cam or arm 172 which is pivotally mounted on the disc 160 as clearly illustrated in Figure 13. The gear segment control arm 172 is so positioned that the outer end thereof projects beyond the periphery of the disc 160 to serve as a means for controlling the opening of the gripper mechanisms of the forming mandrels to permit release of a finished container or cup at a predetermined time in the operation of the machine. The gripper opening control cam arm 172 during the rotation and translation of each of the container or cup mandrel units is brought into contact with a stationary block or boss 173 which is rigidly secured to the rear upper portion of the turret wheel housing 153 as clearly illustrated in Figure 8.

As clearly illustrated in Figure 13 the control bell-crank unit 167—169 is keyed or otherwise secured on a projecting portion of a gripper control sleeve or stem 174 which projects through and is rotatable in the spindle or sleeve 157 as clearly illustrated in Figure 11.

The front end of the gripper control sleeve 174 projects outwardly beyond the front end of the spindle or sleeve 157 into a chambered conical container or cup forming mandrel 175 which is rigidly secured to be rotated with the spindle 157. Each of the cup forming mandrels 175 is provided with a gripper chamber 176 and with an external groove or recess 177 provided in the enlarged exterior portion of the forming mandrel for the reception of the gripping margin or flange of a cup blank as hereinafter more fully described.

Secured by means of a pin or key 178 (Figure 12) on the end of the gripper control sleeve 174 which projects into the chamber 176 of the mandrel is a gripper collar or sleeve 179 having a blank gripper 180 integrally formed radially thereon.

Each of the gripper control sleeves 174 is provided with a compressed air outlet passage 181 which communicates with a main air outlet chamber 182 provided in the mandrel. As clearly illustrated in Figure 11 each of the mandrels is provided with a plurality of auxiliary air outlet passages 183 which extend from the main outlet passage 182 outwardly through the exterior surface of the mandrel a short distance from the apex thereof.

For the purpose of discharging or removing a completed container or cup from one of the forming mandrels 175 when the same reaches the discharge position D a compressed air discharge unit is supported on the top of the bracket 156 as illustrated in Figures 11 and 16. Secured on the rear projecting end of each of the passaged gripper control sleeves 174 is a flanged head or collar 184. Integrally formed on the upper end of the bracket 156 is a sleeve 185 having an axial air passage 186 provided therein. A flanged head 187 is integrally formed on one end of the sleeve 185 and said flanged head is provided with a recess 188 (Figure 11) in which the passaged shank 189 of an adjustable air coupler 190 is slidably engaged. The air coupler head 190 is rounded as illustrated in Figure 11 and is adapted to be normally held resiliently projected by means of coiled springs 191 which are seated in suitable pockets provided in the flanged head 187 with said springs being engaged around slidable stems 192 having heads provided on the outer ends thereof for the purpose of limiting the outward movement of the coupler head 190.

It will thus be noted that when a forming mandrel unit of the cup forming machine is moved into position D into alignment with the air supply sleeve 185 that the flanged head 184 first causes the spring controlled coupler 190 to be depressed to permit the rounded head of the coupler 190 to have a tight resilient contact with the flanged end of the head 184 so that the mandrel unit when reaching the position D is adapted to be positioned in alignment with the compressed air unit to allow a charge of compressed air at a predetermined time to be admitted into the mandrel 175 and the chamber 182 thereof so that a plurality of charges of compressed air are adapted to be emitted through the outlet passages 183 to cause a completed container or cup to be blown off of the mandrel at the time the gripper mechanisms of the mandrel are released.

Connected in the outer end of the sleeve 185 is an air pipe 193 on the outer end of which an air valve unit 194 is secured. A compressed air supply pipe 195 is connected with the upper end of the valve unit 194 to permit a charge of compressed air to be admitted to the machine from any suitable source of air supply. Secured to the exterior of the casing of the valve unit 194 is a downwardly projecting bracket or arm 196 (Figure 16) on the lower end of which an arm or beam 197 is fulcrumed intermediate its ends. One end of the beam 197 is pivotally connected to the lower projecting end of a valve stem 198 which controls the operation of the air valve within the air valve unit 194. Pivotally connected to the opposite end of the fulcrumed beam 197 is the upper end of a connecting bar or rod 199 the lower end of which is pivotally connected to a crank arm 200 which is secured on a rocker shaft 201 mounted in suitable bearing brackets secured to the machine framework rear sill 4 as clearly illustrated in Figure 1. Also secured to the rocker shaft 201 is a crank arm 202 (Figure 5) to which the lower end of a connecting rod 203 is pivotally connected. The upper end of the connecting rod 203 is pivotally connected to a bellcrank 204 which is pivotally mounted on a bracket 205 secured to the rear framework sill 4. Rotatably supported on the bellcrank 204 is a roller 206 which has rolling contact with the periphery of a compressed air control cam 207. The compressed air control cam 207 is keyed or otherwise secured on one end of a shaft 208 which is journalled in the brackets 46 and 47 on which the blank supply magazine is supported. The shaft 208 is the one upon which the large gear 64 is mounted (Figure 18) by which a drive is transmitted to the blank feed rollers of the blank holding magazine.

Associated with each of the cup forming mandrels 175 is a conical presser roll 209 which is rotatably supported in a crank arm 210 secured on one end of a rocker shaft journalled in a bearing 211 secured to the front face of the turret wheel 149 (Figure 6). Secured to the opposite end of the rocker shaft which is journalled in the bearing 211 is a crank arm 212 having an enlarged portion or head at the outer end thereof. The crank arm 212 is adapted to be pivoted by means of a plunger rod 213 which slidably projects through the turret wheel 149 adjacent the hub section thereof and has rotatably mounted in the forked rear end thereof a beveled roller 214. As clearly illustrated in Figures 6 and 11 there are four presser rollers 209 provided, one associated with each of the container or cup forming mandrels 175. The pivotally supported presser rolls 209 due to the action of a control cam 215 are held in rolling contact with the outer surfaces of the conical cup forming mandrels. For the purpose of raising or swinging a rotatable presser roll 209 upwardly out of rolling contact with a container or cup being formed on a forming mandrel when the forming mandrel is in the discharge position D the stationary presser roll control cam 215 is keyed or otherwise secured on the hub or bearing sleeve of the bracket 156 adjacent the stationary control cam 170 as clearly illustrated in Figures 7 and 11. The presser roll control cam 215 is so shaped that the presser rolls are normally adapted to be held in rolling contact with cups on the mandrels from the time that the blanks are fed to the mandrels in position A until the completed cups reach the discharge position D and are ready to be discharged from the machine.

For the purpose of assisting the rotary presser rolls 209 in pressing the cups during the process of forming the same to cause the adhesive on the blank to more securely hold the overlapping portions of the blank secured together a stationary presser unit is provided in the path of travel of the cup forming mandrels. The stationary presser unit comprises a wheel segment 216 the hub portion of which is keyed or otherwise rigidly secured on the front projecting end of the turret wheel supporting shaft 155 as clearly illustrated in Figures 6 and 11 of the drawings. The stationary wheel segment 216 includes a beveled rim 217 having a pad of resilient or flexible material secured thereto. The flexible presser pad 218 as illustrated in Figure 6 extends from substantially the position B to within a short distance of position D so that as the cup forming mandrels are translated from one position to another by the rotatable turret wheel the cups which are being formed on the mandrels are pressed not only by the rotatable pressers 209 but are also rolled over the resilient stationary presser pad 218 so that the glued overlapping portions of the blank forming the cup are sufficiently pressed together before reaching the discharge position D to insure completion of the containers or cups without any danger of the glued portions opening up.

The operation is as follows:

In view of the fact that a somewhat detailed description of the operation of the respective mechanisms comprising the rotary type of conical cup forming machine has already been given in connection with the detailed descriptions of the various auxiliary mechanisms a brief resumé of the operation of the machine embracing the embodiment illustrated and described will now be given.

The machine is adapted to be started by shifting or operating the control or starting lever 14 to cause the starting clutch unit 13 to be moved into coacting relation with the clutch unit 9 (Figure 3) so that a drive from the main driving shaft 12 is transmitted to the driving gear 20 and the auxiliary driving gear 21 to cause rotation of the auxiliary driving shaft 22.

A stack of cup blanks 44 are engaged in the supply magazine between the guide post 50 with the lowermost blank positioned to rest upon the rocker arms 51 above the feeding roller 61 which is operated by the gear trains 25, 64, and 63. With the rotation of the feed roller 61 the pads 62 forming a part thereof are brought into frictional contact with the lowermost blank causing said blank to be removed or fed outwardly from the magazine 49 and advanced between the feed rollers 68 and 70 which are in turn operated by the gears 65, 66, 67, and 69 as clearly illustrated in Figure 18. The rollers 68 and 70 advance the blank onto the table 71 into a position wherein the advanced end of the blank namely the portions bounded by the edges 39 and 40 is advanced beyond the outer edge of said table and beneath the heater 53 and above the glue applying pad 72.

The glue applying mechanisms are operated by the chain 27 causing the large feed roller 83 to carry glue upwardly from the tank 82 with the wiping roller 89 acting to remove surplus glue from said supply roller. The adhesive or glue applying roller 91 is adapted to be moved into rolling contact with the supply roller 83 due to the reciprocating motion of the arms or connecting bars 95 which are actuated from the gear 64 through the connecting bar 102 and the arms 96 and 99. A coating of glue is thus applied or received by the glue applying roller 91 from the glue feed roller 83. The roller 91 after being supplied with a coating of glue is moved away from the supply roller 83 and rolls over the stamping pad 72 to coat the same with a layer of glue.

The glue stamping control cam 24 at this stage in the operation acts on the roller 79 (Fig. 19) to cause the lever arm 78 to swing upwardly thereby causing the glue applying pad 72 to be elevated or pushed upwardly into contact with the under surface of the projecting margin of the cup blank on the table 71 to stamp a patch or coating of glue on the blank as it is pressed against the bottom surface of the heater 53 which serves not only as a stop plate for the blank during the glue applying operation but also acts as a means for heating the glue to prevent premature drying of the glue before the adhesived blank is fed to the forming unit of the machine. After a blank has been stamped with a patch of glue the auxiliary feed control cam 113 acting on the roller 112 (Figure 21) causes the feed arm 104 to be advanced inwardly from the position illustrated in Figure 2 thereby causing the auxiliary feed fingers 105 and 106 to engage the arcuate edge 38 of the glued blank on the table 71 to cause the glued blank to be pushed transversely across the table 71 in a direction substantially at right angles to the original path of movement of the blank from the magazine to the glue applying mechanism, thereby advancing the glued blank into the field of operation of the upper auxiliary feed rollers 114 and 115 and the lower feed rollers 116 and 117 which are operated from the shaft 84 of the glue supply roller 83 through the medium of the beveled gears 132 and 133 (Figure 5) the chain 129 and the gear trains 125—128. The auxiliary feed rollers 114—117 engage the glued blank and advance the same from the table 71 onto the table extension 134 with the straight edge 39 of the glued blank slidably moving along the guide arm 136 to maintain the blank in proper position as it is being advanced toward the cup forming unit of the machine. The glued blank is advanced onto the table extension 134 until the arcuate edge of the blank is positioned part way over the table openings 135 to center the glued blank by means of the curved end of the guide arm 136 (Figure 2) and holding arm or finger 137 beneath which the glued blank is advanced. The adhesived cup blank 44 is advanced over the table extension 134 while the retaining arm 137 is maintained in an elevated position by means of the control disc 142 and the roller 141 which has rolling contact with the periphery of said disc. When the adhesived blank is in the proper position to be fed to one of the forming mandrels in position A the notch 143 of the disc 142 reaches the position of the roller 141 thereby permitting the roller to drop into said notch whereby the retaining arm 137 is lowered into contact with the top surface of the advanced blank 44 to hold the same in proper centered position as the feed control cam 23 coacting with the roller 148 (Figure 5) causes the fingers 144 to swing outwardly through the table extension openings 135 to cause the fingers 144 to engage the arcuate edge 38 of the glued blank to push the blank 44 so that the gripping margin adjacent the inclined edge 42 of the blank is pushed into the opening 176 of a forming mandrel 175 when in the blank receiving position A in which position the gripper 180 is in the open dotted line position of Figure 12 to permit the gripping margin of the blank to be pushed beneath the gripper ready to be engaged thereby.

With the glued blank properly centered as illustrated in Figure 2 with the margin adjacent the edge 42 projecting into a forming mandrel 175 in position A the gripper control mechanisms are brought into operation as the gear segment arm 169 of the cup forming mandrel unit advancing toward position A is brought into coacting engagement with the stationary control cam 170 (Figure 8) to cause the arm 169 to be moved from a position similar to that illustrated in position D of the mandrel into a position corresponding to that illustrated in position A wherein the gripper control cam 167 is positioned to one side of the control roller 166 to cause rotation of the gripper control sleeve 174 (Figure 11) to rock the gripper collar 179 to move the blank gripper from the dotted line position of Figure 12 into the full line gripping position of said figure to cause the margin 42 of the blank projecting into the opening of the mandrel to be gripped ready to have the blank formed into a cup.

When the machine is in operation the turret wheel 149 is continuously rotated at a variable speed controlled by the eccentric discs 33 and 37 which connect the auxiliary driving shaft 22 with the shaft 31 by means of the block 34 and the guide bars 36 in the arrangement illustrated in Figures 9 and 10 of the drawings. The variable speed is transmitted from the shaft 31 to the spiral gear 30 which is in meshing engagement with the turret wheel gear 152 whereby the turret wheel is caused to rotate at a variable speed to cause slowing up of the rotation of the turret wheel at each quarter rotation of the turret wheel as the rotatable mandrels pass through the positions A, B, C, and D to permit a glued blank to be fed to a mandrel in position A while a completed cup on a mandrel in position D is released and discharged from the machine.

With the continuous rotation of the turret wheel at a variable speed a mandrel 175 as it is advanced from station to station is rotated by means of the gear 159 coacting with the large internal gear 154. The gripped blank which is engaged by the gripper 180 of the mandrel when in position A is drawn off of the table extension 134 and with the axial rotation of the mandrel said gripper blank is wound around the mandrel beneath the rotatable presser roll 209 coacting with said mandrel. As the glued blank is wound around the mandrel the glued margin overlaps a portion of the body section of the blank to form a glued seam while the glued surface of the tab 41 of the blank is spirally wound around the apex portion of the cup under construction thereby reinforcing the apex end of the conical container or cup. The rotatable pressing roller 209 serves to press the glued margin of the blank as the blank is being formed into a cup and is advanced from position A through positions B and C toward the discharge position D. As the cup is being formed and advanced through the various positions the flap or margin 42 of the blank is positioned on the inside of the cup body and is engaged by the gripper 180. During the course of travel of a cup through the various positions the cup is brought into contact with the resilient presser pad 218 which is mounted on the stationary wheel segment rim 217 whereby additional pressing or ironing of the cup under construction is performed to insure proper adhesion of the overlapping portions of the cup blank.

The continuous rotation of the turret wheel carries the ironed or pressed cup toward position D thereby bringing the presser roller control roller 214 into engagement with the raised or projecting portion of the stationary control cam 215 (Figure 7) to cause the plunger 213 to be projected outwardly against the crank arm 212 to cause partial rotation of the rocker shaft within the bearing 211 thereby actuating the crank arm 210 causing the presser roller 209 to be pivotally swung outwardly away from the completed cup engaged on the forming mandrel.

As a completed cup is carried by a mandrel into the position D the gripper release control arm 172 is carried into coacting engagement with the stationary control boss or block 173 (Figure 8) to cause pivotal swinging of the control arm 172 from the position illustrated in position C of Figure 8 into the gripper release position of said control arm 172 as illustrated in position D. This pivotal swinging of the control arm 172 causes the gear segment 171 to coact with the gear segment 168 to move the gripper control cam or projection 167 to cause rotation of the gripper control sleeve 174 thereby causing the gripper 180 to be moved from the closed full line position illustrated in Figure 12 into the dotted open line position of said figure thereby releasing the gripped margin 42 positioned on the inside of the formed cup. The spring controlled pawl arm 165 has the roller 166 thereof coacting with the cam or projection 167 of the control arm 169 to resiliently hold the gripper 180 in gripping engagement with the margin 42 of a cup blank so that the gripper is adapted to be actuated with a snappy action at predetermined times to either grip a cup blank or release the gripped margin of a completed cup.

As a mandrel is advanced into the discharge position D the head 184 (Figure 11) on the rear end of the gripper control sleeve 174 is brought into coacting engagement with the rounded head 190 forming part of the compressed air discharge unit thereby causing the passaged head 190 to be depressed to permit the mandrel unit to be brought into axial alignment with the compressed air discharge unit as clearly illustrated in Figure 11 when the air passage 186 is aligned with the air passage 181. At this stage in the operation the compressed air control cam 207 (Figure 5) actuates the bellcrank 204 which in turn operates the members 203 and 202 to cause the rocker shaft 201 to be partly rotated to operate the crank arm 200 which in turn actuates the connecting link 199 and the fulcrumed beam 197 to cause the compressed air valve within the valve housing 194 to be opened to permit a charge of compressed air from the supply pipe 195 to be admitted into the passage 186 and the passage 181 thereby admitting the charge of compressed air into the mandrel chamber 182 from which the compressed air is permitted to escape through the outlet passages 183 to strike against the interior of the released cup to blow the cup from the mandrel.

As a cup is being released and discharged from a mandrel in position D another adhesived cup blank is fed to a mandrel in position A to be gripped by the gripper mechanisms of said mandrel so that with the continuous rotation of the variable speed turret wheel a plurality of cups are simultaneously under process of construction so that with the four mandrel arrangement disclosed a completed cup is discharged at each quarter revolution of the turret wheel while an additional glued blank is fed to a mandrel in position A of the turret wheel.

It will of course be understood that many changes may be made and numerous details of construction may be varied through a wide range without departing from the principles of this invention and it is therefore not the purpose to limit the patent granted hereon otherwise than necessitated by the scope of the appended claims.

I claim as my invention:

1. In a cup making machine the combination with a rotatable turret wheel, of cup forming mandrels rotatably supported thereon for receiving blanks and forming the same into cups, pivotally mounted brackets supported on said turret wheel, presser rollers rotatably supported on said brackets for coaction with the mandrels to press the cups during the formation thereof, roller carrying plungers slidably projecting through the turret wheel for coaction with said brackets, means back of the turret wheel coacting with the roller carrying plungers at predetermined times to push the plungers outwardly to cause the presser rollers to be moved into released position, and means for removing the pressed cups from the mandrels when the presser rollers are released.

2. In a cup forming machine the combination with a rotatable turret wheel, of cup forming mandrels rotatably supported thereon for receiving and forming blanks into cups, brackets pivotally supported on said turret wheel, pressers rotatably supported on said brackets in coacting engagement with said mandrels to press the cups during the formation thereof, plungers slidably projecting through said turret wheel to coact with said brackets, rollers on the rear ends of said plungers, and a stationary cam positioned to have the rollers track thereon to cause the plungers at predetermined times in the rotation of the turret wheel to operate the brackets to move the pressers into released position when the mandrels reach a cup discharge position.

3. In a cup forming machine the combination with a rotatable turret wheel, of means for operating the same, mandrels rotatably supported on said turret wheel, grippers in said mandrels, means for feeding glued blanks to the mandrels to be engaged by said grippers to cause the glued blanks to be formed around the mandrels to form cups, rotatable pressers carried by the turret wheel to coact with the mandrels to cause pressing of the cups being formed, a stationary control, plunger means carried by the turret wheel to be operated by the stationary control at predetermined times to cause the rotatable pressers to be moved into released position when the mandrels reach a discharge position, coacting gear segment control members carried by each of the mandrels, stationary means positioned in the path of travel of said interfitting gear segment members to actuate the same at predetermined times to cause operation of the grippers, means carried by each of the mandrels to coact with said gear segment members for holding the grippers in open and closed position, and stationary pneumatic means positioned to permit the mandrels to be brought into coacting relation therewith to cause a completed cup to be blown from a mandrel when the rotatable presser and the gripper of the mandrel are released.

4. In a cup making machine of the class described the combination with a rotatable turret wheel, of a rotatable mandrel supported thereon, means for feeding a cup blank to the mandrel, a gripper in said mandrel for gripping the blank, a rotatable presser pivotally supported on the turret wheel for coaction with the mandrel to cause the blank to be wound around the mandrel to form a cup, plunger means carried by the turret wheel for coaction with the presser, a stationary cam coacting with the plunger means to cause movement of the presser away from the mandrel when a cup has been completed, coacting control members connected with the gripper, and a plurality of stationary devices positioned to be contacted by the coacting control members to cause closing of the gripper when a blank has been fed to the mandrel and opening of the gripper to release a finished cup.

5. In a cup making machine of the class described the combination with a turret wheel, of a sleeve rotatably supported therein, means for rotating the sleeve with respect to the turret wheel, a chambered mandrel secured on one projecting end of said sleeve, a disc secured on the opposite projecting end of the sleeve, a blank gripper in said mandrel for gripping a blank to cause the same to be wound around the mandrel to form a cup, a stem projecting through said sleeve and into the mandrel to provide a support for the gripper, a gripper opening gear segment control member pivotally supported on said disc, a gripper closing gear segment control member secured to the projecting end of said stem and coacting with the gripper opening gear segment control member, a projection forming a part of the gripper closing gear segment control member, an arm pivotally supported on said disc, a roller on said arm coacting with said projection, a control spring connected with said arm and with said disc for holding the roller in contact with said projection and also serving as a means for resiliently holding the gear segment control members in set positions of adjustment, and stationary means positioned to cause actuation of the gear segment control members at predetermined times to cause closing of the gripper when a blank is fed to the mandrel and furthermore cause opening of the gripper to release a formed cup on the mandrel.

6. In a cup forming machine the combination with a blank magazine, of a gluing mechanism, an adjustable support in said magazine for supporting a stack of blanks, a table positioned between the magazine and said gluing mechanism, means for feeding a blank from the magazine onto said table to be glued, a movably mounted heater affording a stop for a blank being glued, means for connecting the heater with the adjustable blank support to cause elevation of a stack of blanks in the magazine when the heater is raised, a cup forming mechanism disposed at an angle to said magazine, a pusher device for pushing a glued blank over said table, roller means for engaging the pushed blank to continue the advancement thereof toward the cup forming mechanism, and pivoted means for engaging the advanced blank and delivering the same to the cup forming mechanism.

7. In a cup forming machine the combination with a blank feed magazine, of a blank gluing mechanism, an adjustable blank support in said magazine for supporting a stack of blanks, a feed means for removing a blank from the magazine and delivering the same to said gluing mechanism to be glued thereby, a blank heater adapted to be adjusted to cause raising of the adjustable blank support to raise the stack of blanks in the magazine out of the field of operation of the blank feed means, a pusher for engaging and advancing a glued blank, a plurality of sets of rollers for engaging the glued blank to continue the advancement thereof, guide members for centering the advanced blank, a cup forming mechanism, and pivoted means for engaging the centered blank and delivering the same to the cup forming mechanism to be formed into a cup.

8. In a cup making machine the combination with a blank feed magazine, of a gluing mechanism, means for delivering cup blanks from the magazine to the gluing mechanism to be stamped with glue, a cup forming mechanism, a pusher mechanism for engaging and advancing a glued blank toward the cup forming mechanism, roller mechanisms for continuing the advance of the glued blank toward the cup forming mechanism, guide members for centering the glued blank and means for engaging and feeding the advanced centered blank to the cup forming mechanism.

9. In a cup forming machine, the combination with a blank feed magazine, of an adhesive applying means opposite the same, a cup forming means positioned at an angle to said magazine and to said adhesive applying means, and feed mechanisms for first advancing blanks from the magazine to the adhesive applying means and then advancing the adhesived blanks at right angles to their original path of movement for delivering adhesived blanks to the inclined cup forming means.

10. A cup forming machine including in combination a framework, a cup blank magazine supported thereon, a gluing means on said framework parallel to said magazine, a cup former positioned at an angle on said framework and at an angle with respect to the magazine and said gluing means, and feed mechanisms for first delivering blanks from the magazine to the gluing means and then advancing the blanks at right angles to their original direction of movement to the inclined cup former.

11. In an apparatus of the character described, in combination, a framework, a vertical turret wheel supported diagonally thereon, cup formers carried by the turret wheel and disposed diagonally with respect to the framework, and means for advancing cup blanks through consecutive paths at right angles to one another into engagement with the formers to be formed into cups.

12. In a cup-forming machine, a rotatable turret wheel, cup forming mandrels thereon, presser means mounted for co-action with said mandrels to press cups during the formation thereof, plunger means projecting through the turret wheel for controlling the operation of said presser means, and means positioned to cooperate with the plunger means in its travel to cause the plunger means at predetermined times in the rotation of the turret wheel to move the presser means into released position.

13. In a cup making machine, rotatable cup forming mandrels, means carrying said mandrels through a translatory path, rotatable presser means traveling with said mandrels for pressing cups being formed on said mandrels, and a resilient stationary presser position in the translatory path of said mandrels and against which cups on said mandrels must press in passing.

14. In a cup making machine, translatory carrying means, a cup forming mandrel carried by said means, rotary presser means traveling with said mandrel to press a cup thereon, and stationary resilient presser means bearing against a cup on said mandrel during the translation thereof and cooperating with said rotary presser means.

15. In a cup making machine, a movable carrying member, a cup forming mandrel on and translatable by said member, rotary presser means for pressing a cup on said mandrel, and stationary presser means for also pressing the cup, said presser means acting successively and simultaneously.

16. In a cup making machine, a movable carrying member, a cup forming mandrel on and translatable by said member, rotary presser means for pressing a cup on said mandrel, and stationary presser means for also pressing the cup, one of said presser means being translatable with said mandrel.

17. In a cup making machine, a movable carrying member, a cup forming mandrel on and translatable by said member, rotary presser means for pressing a cup on said mandrel, and stationary presser means for also pressing the cup, one of said presser means being translatable with said mandrel and the other of said presser means being disposed in the translatory path of said mandrel to be contacted by the cup during translation.

18. In a cup making machine, a movable carrying member, a cup forming mandrel on and translatable by said member, and both resilient and non-resilient presser means for pressing a cup on said mandrel arranged to act successively and simultaneously.

19. In a cup making machine, a movable carrying member, a cup forming mandrel on and translatable by said member, and both resilient and non-resilient presser means for pressing a cup on said mandrel, said presser means acting on opposite sides of the cup on said mandrel.

20. In a cup making machine, a cup forming mandrel capable of holding and forming a blank into cup shape, a movable element carrying said mandrel and arranged to translate the mandrel from a blank receiving station to a cup discharge station, presser means translatable with said mandrel for pressing the blank on the mandrel, and plunger means operable to move said presser means away from said mandrel prior to said mandrel reaching said discharge station.

21. In a cup making machine, a cup forming mandrel capable of carrying and forming a blank into cup shape, a movable element carrying said mandrel and arranged to translate the mandrel from a blank receiving station to a cup discharge station, resilient presser means, non-resilient presser means, both said presser means being arranged to press a blank on said mandrel during its translation, said mandrel carrying the blank off one of said presser means prior to reaching the discharge station, and means operable to move the other of said presser means away from said mandrel prior to reaching the discharge station.

22. In a cup making machine, a cup forming mandrel capable of carrying and forming a blank into cup shape, a movable element carrying said mandrel and arranged to translate the mandrel from a blank receiving station to a cup discharge station, stationary presser means in the translatory path for pressing a blank carried by the mandrel and of such length that the mandrel will pass thereby prior to reaching the discharge station, other presser means translatable with said mandrel, and means operable to move said other presser means away from said mandrel prior to the discharge station.

23. In a cup making machine, a cup forming mandrel capable of carrying and forming a blank into cup shape, a movable element carrying said mandrel and arranged to translate the mandrel from a blank receiving station to a cup discharge station, a pivotally mounted rotary presser member translatable with said mandrel to press a blank carried by the mandrel during translation, and plunger means operable to pivot said member away from said mandrel prior to reaching the discharge station.

CESARE BARBIERI.